H. S. COX.
AUTOMOBILE WINDSHIELD FITTING.
APPLICATION FILED AUG. 5, 1920.
1,414,626. Patented May 2, 1922.
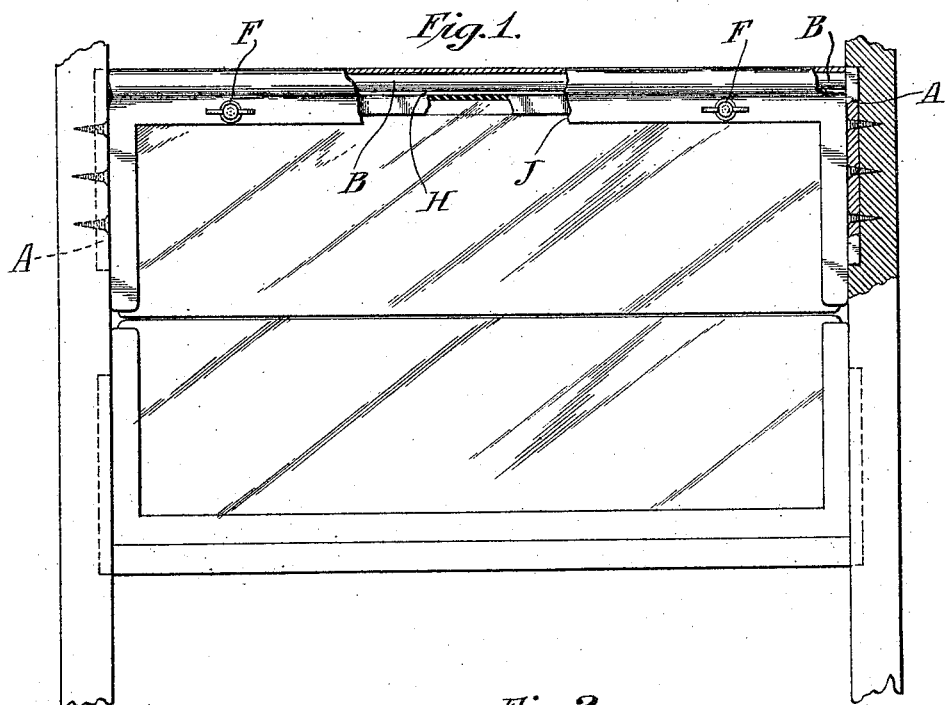
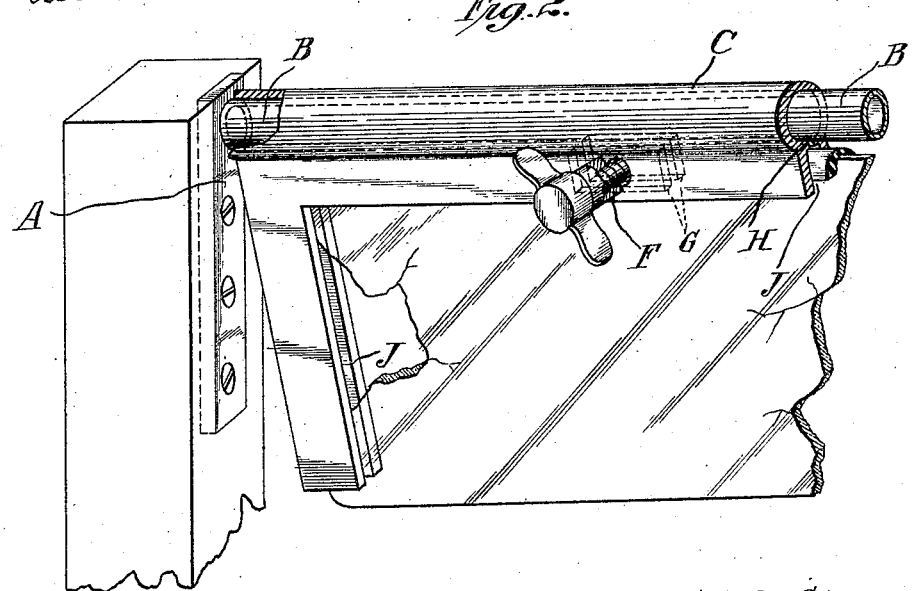
Herbert Stanley Cox.
Inventor:
Attest:
by
Atty

UNITED STATES PATENT OFFICE.

HERBERT STANLEY COX, OF LONDON, ENGLAND, ASSIGNOR TO WILLIAM J. McCRUDDEN, OF LEEDS, NEW YORK.

AUTOMOBILE WINDSHIELD FITTING.

1,414,626.  Specification of Letters Patent.  Patented May 2, 1922.

Application filed August 5, 1920. Serial No. 401,551.

*To all whom it may concern:*

Be it known that I, HERBERT STANLEY Cox, a citizen of Great Britain, residing in London, England, have invented a new and useful Improvement in Automobile Windshield Fittings, of which the following is a full, true, and exact description, reference being had to the accompanying drawing.

This invention relates to an improvement in automobile wind shield fittings. Heretofore there has been great difficulty in holding the windshield glass firmly at the different angles that may be desired whereas by my invention it is readily and firmly clasped at any angle. This I accomplish by surrounding a fixed rod around which the windshield pivots by a glass holder having a cylindrical opening slotted for the whole or part of its length and providing a clamping screw to close this cylindrical slotted opening thereby locking the two parts firmly together. There may be one or two of such locking contrivances depending on the length and weight of the glass but generally two are provided one at each end of the fixed rod.

My invention will be readily understood from the accompanying drawings in which Fig. I represents a vertical elevation of the wind shield in position and Fig. II a detail of the clamping slotted cylindrical portion.

In my drawings A represents the fixed part or support of the windshield to which is attached the cylindrical part or parts B. The part B may be continuous between the supporting parts A or there may be two such parts at either end of the windshield. The tubular part C may be slotted as shown at H for its entire length or only slotted near the clamping screw F. This screw closes the lugs G attached to either side of the slot H. One end of the clamping screw F is firmly supported by the front lug. This screw passes through the other lug and serves as an added bearing or support for the pressure of the butterfly nut. There is sufficient opening between them to allow of the adjustment of the two sides of the slot. The lugs G are attached on the inside of the slot facing each other and strengthen the sides of the slot in order to furnish proper bearings for the clamping screw F. The glass is supported in the slot J generally by rubber packing. It will be readily observed that by this arrangement a frictional clamping contact between the fixed cylindrical part B and the tubular part C is obtained if desired for the entire distance between the supports of the part B. These parts when clamped together are held absolutely in the clamped position and the arrangement is entirely different in this respect from the usual one of clamping the ends only of the movable part. This rubber packing has sufficient contact to hold the glass during the period when the glass may be adjusted from one position to another but the closing of the slot firmly clamps the rubber packing against the glass, the operation of the screw therefore performing the double function of clamping the tubular part C against the support B and also closing the rubber packing against the glass. The upper edge of the glass preferably is cut away to allow the passage of the screw F without lowering the glass in the frame.

What I claim as my invention and desire to secure by Letters Patent is—

In a pivoted windshield the combination of the fixed rod B, the slotted cylindrical sleeve C, the closing screw F serving to close the slot in the cylindrical portion thereby simultaneously clamping the cylinder C upon the rod B and clamping the glass firmly in position substantially as described.

HERBERT STANLEY COX.